United States Patent
Abdellatif et al.

(10) Patent No.: US 11,584,516 B2
(45) Date of Patent: Feb. 21, 2023

(54) BI-STABLE AND SWITCHABLE MAGNETIC LEGS FOR UAV LANDING ON CURVED SURFACES

(71) Applicants: Saudi Arabian Oil Company, Dhahran (SA); KING ABDULLAH UNIVERSITY OF SCIENCE AND TECHNOLOGY, Thuwal (SA)

(72) Inventors: Fadl Abdellatif, Thuwal (SA); Ahmed Al Brahim, Thuwal (SA); Sahejad Patel, Thuwal (SA); Jeff S. Shamma, Thuwal (SA)

(73) Assignees: Saudi Arabian Oil Company, Dhahran (SA); King Abdullah University Of Science And Technology, Thuwal (SA)

( * ) Notice: Subject to any disclaimer, the term of this patent is extended or adjusted under 35 U.S.C. 154(b) by 213 days.

(21) Appl. No.: 17/107,715

(22) Filed: Nov. 30, 2020

(65) Prior Publication Data
US 2022/0169368 A1 Jun. 2, 2022

(51) Int. Cl.
*B64C 25/32* (2006.01)
*B64C 39/02* (2006.01)

(52) U.S. Cl.
CPC .......... *B64C 25/32* (2013.01); *B64C 39/024* (2013.01); *B64C 2201/027* (2013.01); *B64C 2201/08* (2013.01); *B64C 2201/18* (2013.01)

(58) Field of Classification Search
CPC .................. B64C 25/32; B64C 2201/18
See application file for complete search history.

(56) References Cited

U.S. PATENT DOCUMENTS

| | | | |
|---|---|---|---|
| 10,037,632 B2* | 7/2018 | Dudar | G08G 1/167 |
| 10,081,421 B2 | 9/2018 | Semke et al. | |
| 11,097,796 B2* | 8/2021 | Abdellatif | G01S 17/89 |

(Continued)

FOREIGN PATENT DOCUMENTS

| | | |
|---|---|---|
| CN | 206318030 U | 7/2017 |
| CN | 208915429 U | 5/2019 |

(Continued)

OTHER PUBLICATIONS

International Search Report and Written Opinion in a corresponding PCT Application No. PCT/US2021/061141, dated Mar. 4, 2022; 11 pages.

*Primary Examiner* — Brady W Frazier
*Assistant Examiner* — Shanna Danielle Glover
(74) *Attorney, Agent, or Firm* — Leason Ellis LLP

(57) ABSTRACT

An unmanned aerial vehicle (UAV) configured to land, take off, and magnetically perch on a ferromagnetic cylindrical surface is provided. The UAV includes a body and articulated magnetic legs configured to land and magnetically perch the UAV on the cylindrical surface. Each magnetic leg has a fixed portion coupled to the body and a pivoting portion pivotably coupled to the fixed portion at a pivot axis. The pivoting portion includes a switchable magnet and a single articulation joint that provides the pivoting portion with a single degree of freedom about the pivot axis to passively orient the pivoting portion inward and tangent to the cylindrical surface in response to the pivoting portion contacting the cylindrical surface during the landing, and to passively maintain the inward orientation of the pivoting portion during the takeoff.

20 Claims, 8 Drawing Sheets

(56) References Cited

U.S. PATENT DOCUMENTS

| | | | |
|---|---|---|---|
| 2017/0217571 A1* | 8/2017 | Deng | ................... B64C 25/10 |
| 2019/0314990 A1* | 10/2019 | Sugaki | ................... B25J 9/162 |
| 2020/0172231 A1 | 6/2020 | Abdellatif et al. | |
| 2021/0356255 A1* | 11/2021 | Sweers | ................ B64C 39/024 |

FOREIGN PATENT DOCUMENTS

| | | |
|---|---|---|
| KR | 20140078251 A1 | 6/2014 |
| KR | 20160129786 A | 11/2016 |
| KR | 20190114129 A | 10/2019 |
| WO | 2016075428 A1 | 5/2016 |
| WO | 2018029138 A1 | 2/2018 |
| WO | 2020112859 A1 | 6/2020 |

* cited by examiner

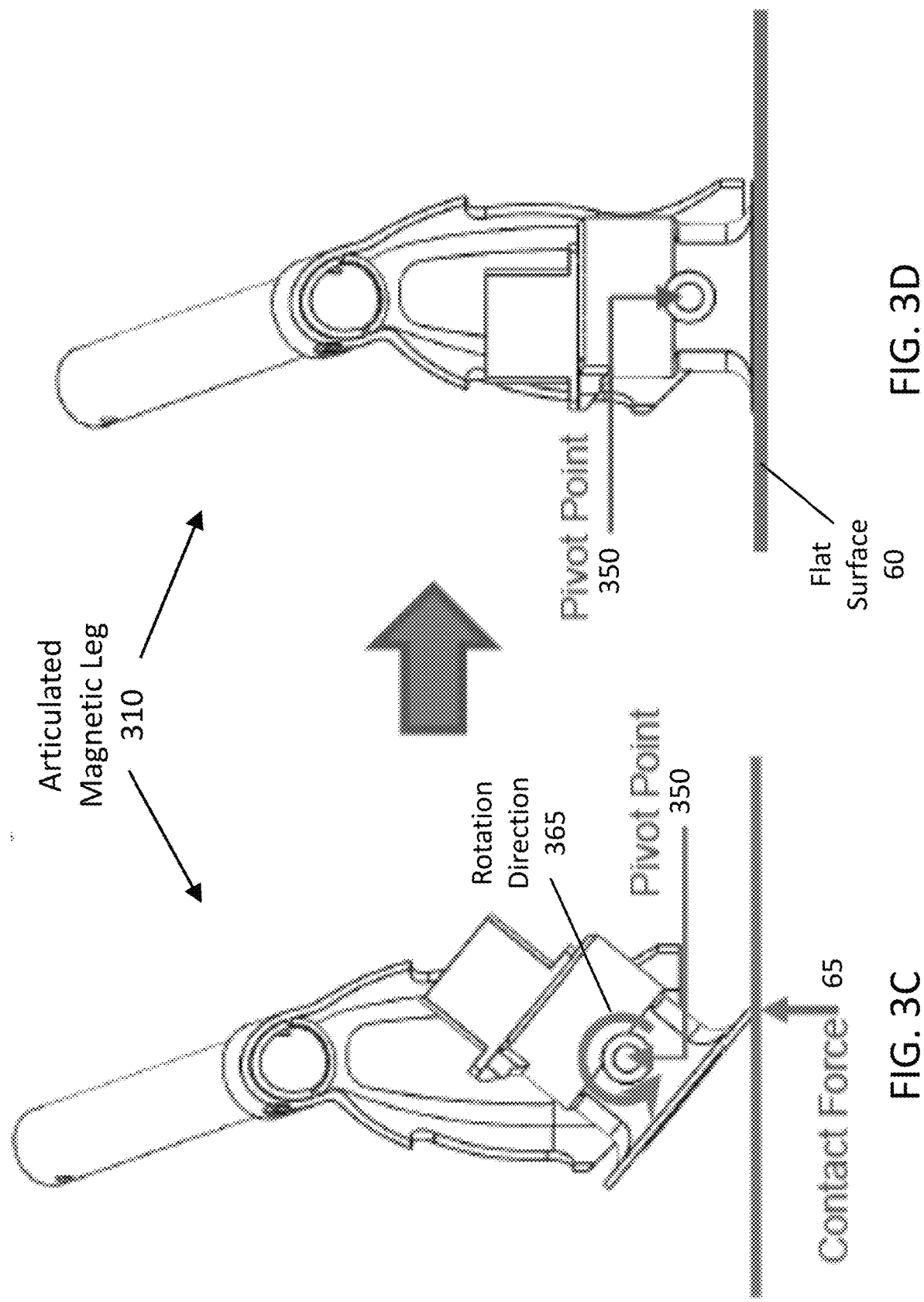

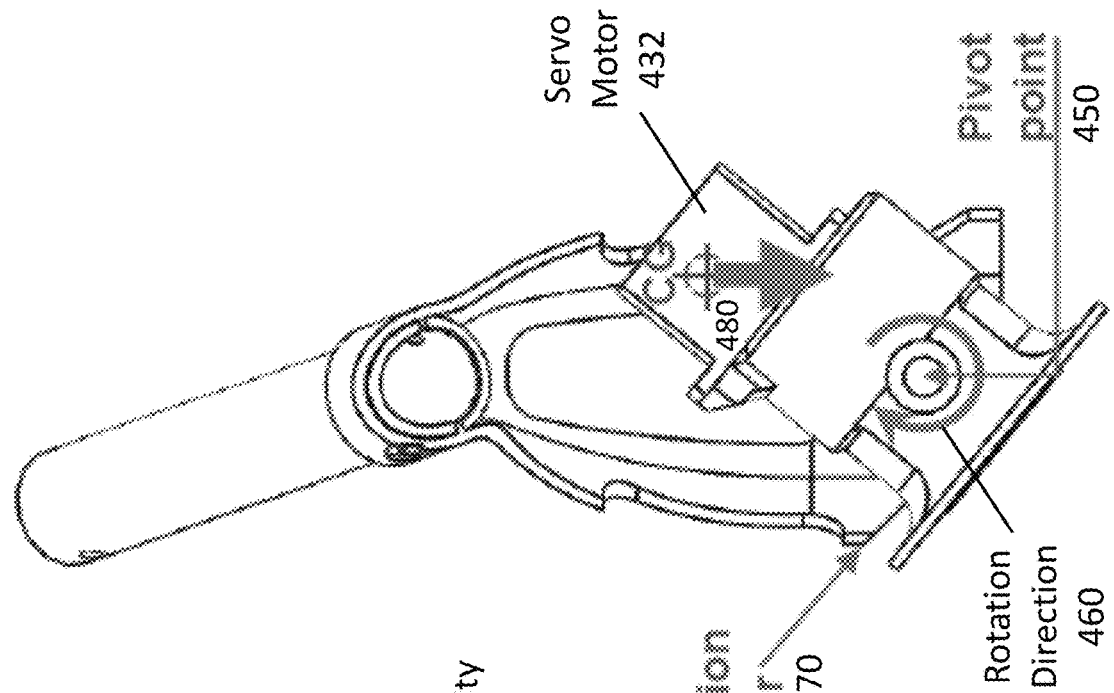
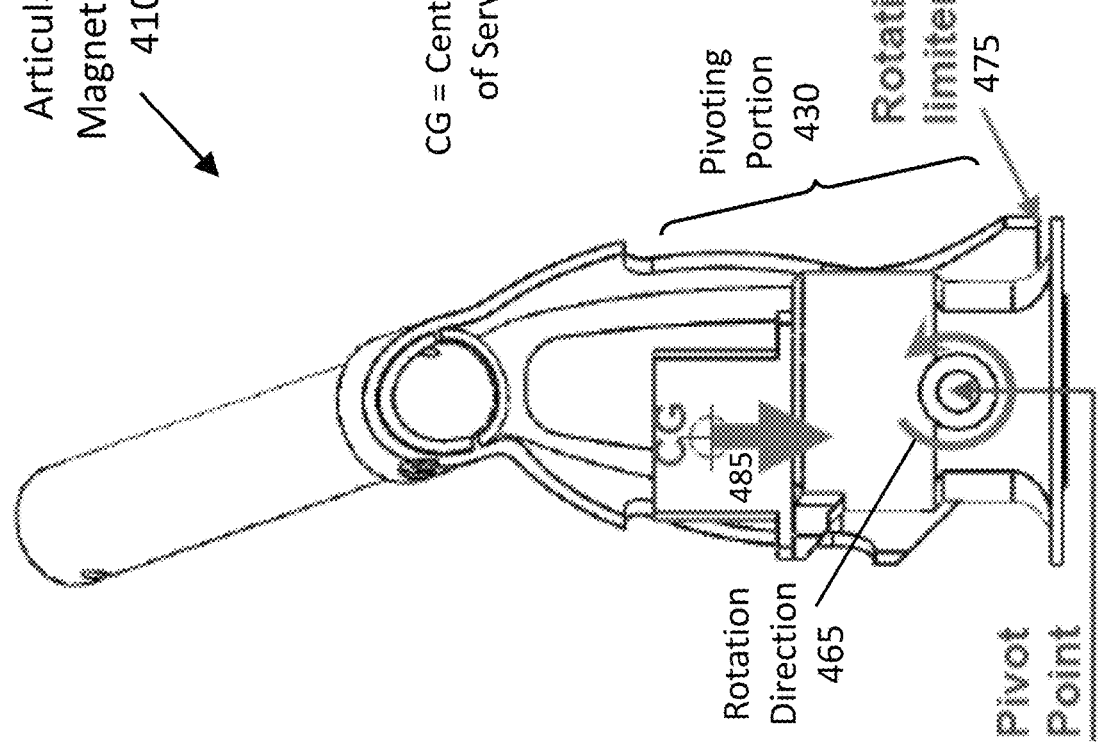
FIG. 4B
FIG. 4A

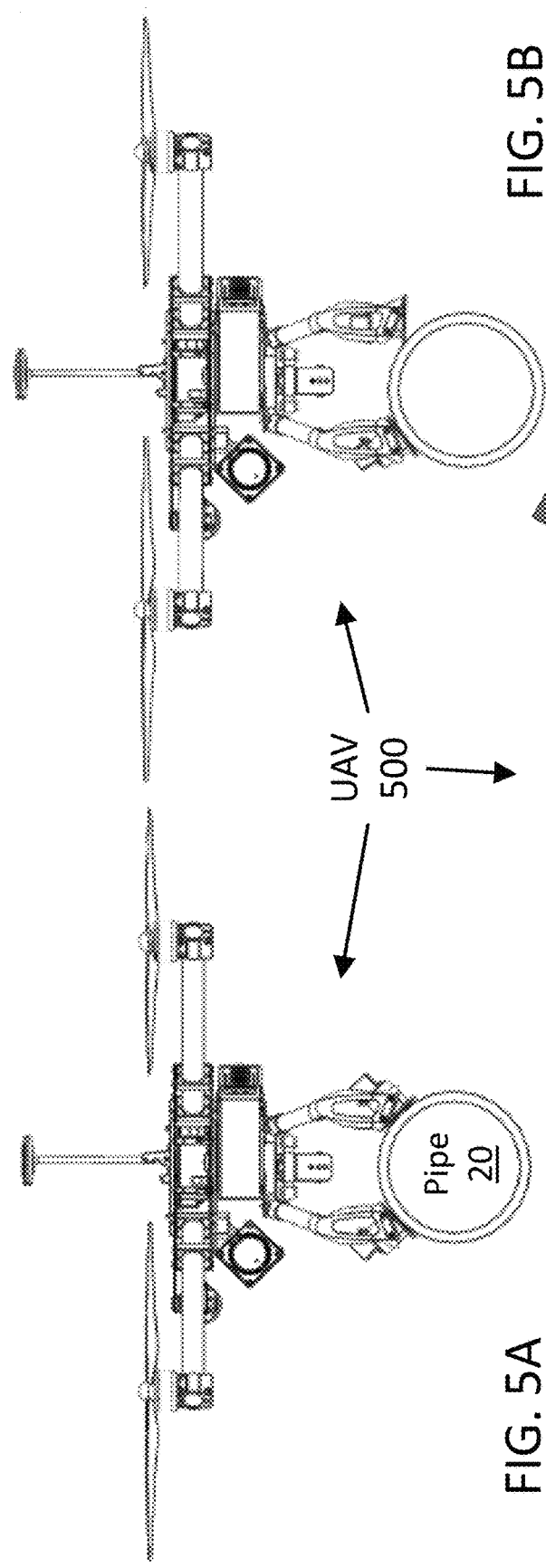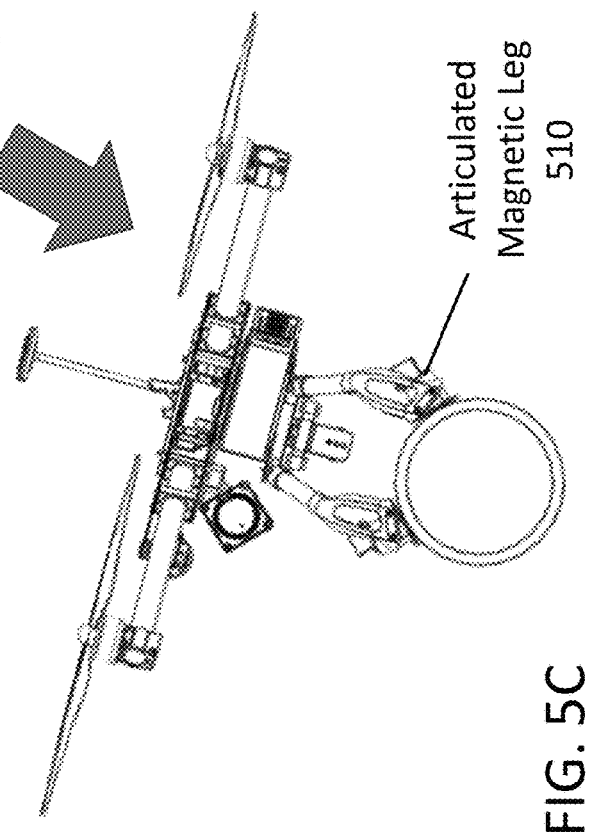
FIG. 5A  FIG. 5B  FIG. 5C

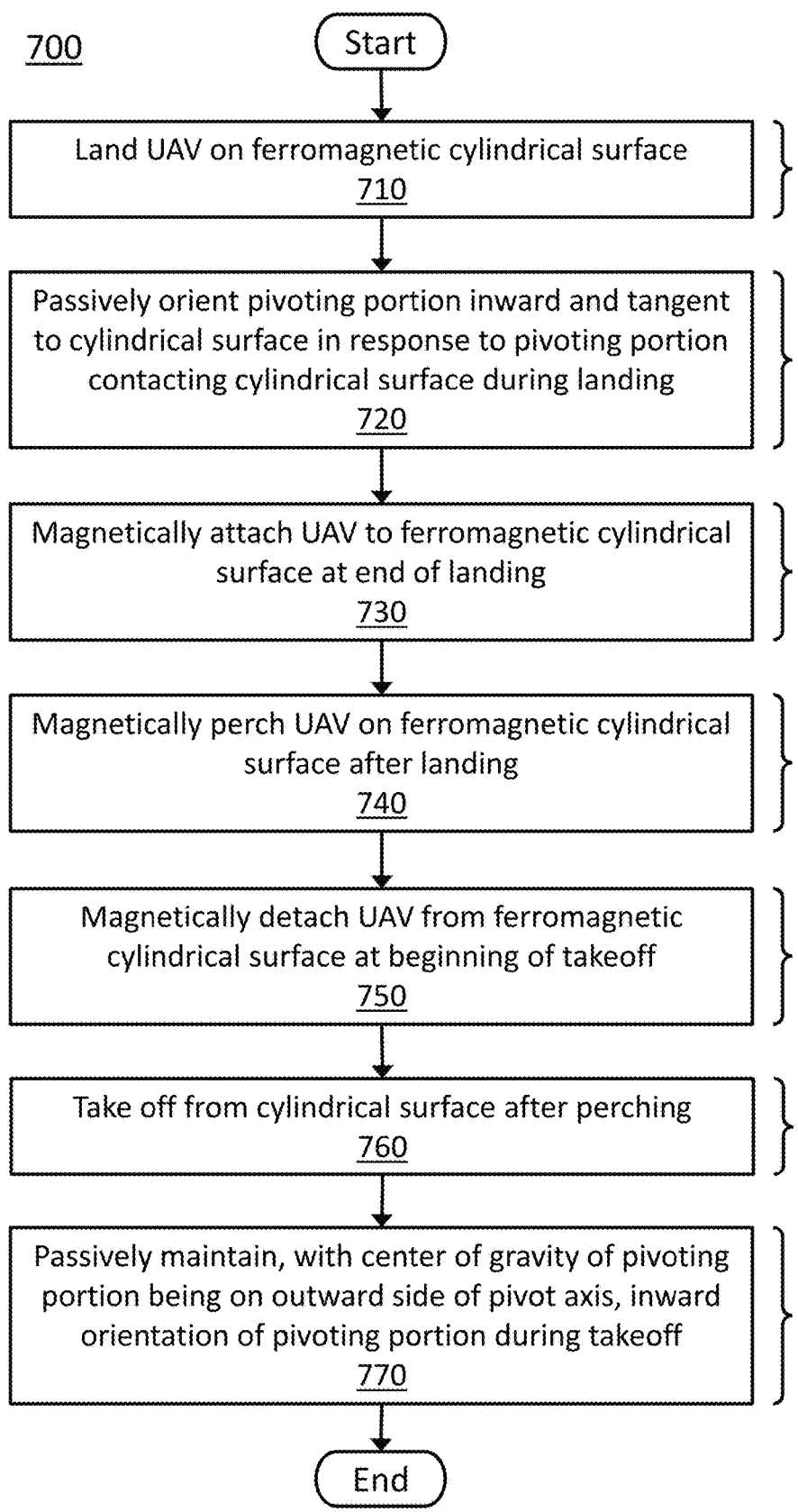

BI-STABLE AND SWITCHABLE MAGNETIC LEGS FOR UAV LANDING ON CURVED SURFACES

FIELD OF THE DISCLOSURE

The present disclosure relates generally to a mechanical system design that enables an unmanned aerial vehicle (UAV or drone) to use switchable magnetic legs in order to magnetically land or perch on curved ferromagnetic surfaces such as carbon steel pipes.

BACKGROUND OF THE DISCLOSURE

One of the top challenges in the oil and gas industry is the periodic inspection of elevated assets found in refineries, gas plants, offshore platforms, and other plants and facilities. These assets include high-elevation pipes and other structures that are difficult to access during inspection jobs. Often, the only practical way to inspect them is to erect scaffolding in order for the inspector to access the asset and perform a manual inspection. Such scaffolding is not only expensive and introduces a significant cost barrier for frequent inspection, but also poses safety concerns mainly in the form of falling and tripping hazards.

It is in regard to these and other problems in the art that the present disclosure is directed to provide a technical solution for an effective UAV having bi-stable and switchable magnetic legs for landing on curved ferromagnetic surfaces.

SUMMARY OF THE DISCLOSURE

According to a first aspect of the disclosure, an unmanned aerial vehicle (UAV) configured to land, take off, and magnetically perch on a ferromagnetic cylindrical surface is provided. The UAV comprises a body and a plurality of articulated magnetic legs configured to land the UAV on the ferromagnetic cylindrical surface and to magnetically perch the UAV on the ferromagnetic cylindrical surface after the landing. Each magnetic leg has a fixed portion coupled to the body and a pivoting portion pivotably coupled to the fixed portion at a pivot axis. The pivoting portion comprises a switchable magnet and a single articulation joint configured to provide the pivoting portion with a single degree of freedom about the pivot axis in order to passively orient the pivoting portion inward and tangent to the cylindrical surface in response to the pivoting portion contacting the cylindrical surface during the landing, and to passively maintain the inward orientation of the pivoting portion during the takeoff. The magnetism of the switchable magnet is switched on to magnetically attach the UAV to the ferromagnetic cylindrical surface at an end of the landing and throughout the perching, and switched off to magnetically detach the UAV from the ferromagnetic cylindrical surface at a beginning of the takeoff.

In an embodiment consistent with the above, the fixed portion of each magnetic leg comprises an inward rotation limiter configured to limit the inward rotation of the pivoting portion during the landing and the takeoff.

In an embodiment consistent with the above, the UAV is further configured to land on and take off from a flat surface, and the articulation joint of each magnetic leg is further configured to provide the pivoting portion with the single degree of freedom about the pivot axis in order to passively orient the pivoting portion flat and parallel to the flat surface in response to the pivoting portion contacting the flat surface during the landing on the flat surface, and to passively maintain the flat orientation of the pivoting portion during the takeoff from the flat surface.

In an embodiment consistent with the above, the fixed portion of each magnetic leg comprises an outward rotation limiter to limit the outward rotation of the pivoting portion to a mostly flat orientation during the landing on and the takeoff from the flat surface.

In an embodiment consistent with the above, the pivoting portion of each magnetic leg further comprises a switch actuator at a top of the switchable magnet and configured to actuate the magnet in order to switch the magnet between on and off, the center of gravity of the switch actuator being on an outward side of the pivot axis during the takeoff from the cylindrical surface, and on an inward side of the pivot axis during the takeoff from the flat surface.

In an embodiment consistent with the above, each magnetic leg further comprises an angle rotation sensor configured to measure a pivot of the pivoting portion about the pivot axis after the pivoting portion contacts the cylindrical surface.

In an embodiment consistent with the above, the UAV further comprises a control circuit configured to determine when to switch on the magnets of the magnetic legs at the end of the landing using the measured pivots of the pivoting portions of the magnetic legs.

In an embodiment consistent with the above, for each magnetic leg, the pivoting portion comprises a switch actuator coupled to a top of the magnet and configured to actuate the magnet in order to switch the magnet between on and off, and the control circuit is further configured to control the switch actuator to switch on the magnet when the measured pivots of the pivoting portions of the magnetic legs are the same inward angle.

In an embodiment consistent with the above, the UAV further comprises a control circuit configured to determine the diameter of a cylinder corresponding to the cylindrical surface using the measured pivots of the pivoting portions of the magnetic legs.

In an embodiment consistent with the above, the UAV further comprises a control circuit configured to determine a distance from the body to the cylindrical surface using the measured pivots of the pivoting portions of the magnetic legs.

In an embodiment consistent with the above, the ferromagnetic cylindrical surface is part of a carbon steel pipe or vessel.

According to another aspect of the disclosure, a method of landing, taking off, and magnetically perching an unmanned aerial vehicle (UAV) on a ferromagnetic cylindrical surface is provided. The UAV comprises a body and a plurality of articulated magnetic legs each having a fixed portion coupled to the body and a pivoting portion pivotably coupled to the fixed portion at a pivot axis. The pivot portion comprises a switchable magnet and a single articulation joint having a single degree of freedom about the pivot axis. The method comprises: landing the UAV on the ferromagnetic cylindrical surface using the magnetic legs; passively orienting, for each magnetic leg using the single articulation joint with the single degree of freedom about the pivot axis, the pivoting portion inward and tangent to the cylindrical surface in response to the pivoting portion contacting the cylindrical surface during the landing; magnetically attaching the UAV to the ferromagnetic cylindrical surface at an end of the landing by switching on the switchable magnet in each magnetic leg; magnetically perching the UAV on the ferromagnetic cylindrical surface after the landing using the magnetic legs while their respective switchable magnets remain switched on; magnetically detaching the UAV from the ferromagnetic cylindrical surface at a beginning of the takeoff by switching off the switchable magnet in each magnetic leg; taking off with the UAV from the cylindrical surface after the perching; and passively maintaining, for each magnetic leg using the articulation joint and with the center of gravity of the pivoting portion being on an outward side of the pivot axis, the inward orientation of the pivoting portion during the takeoff.

In an embodiment consistent with the method described above, the method further comprises limiting, for each magnetic leg using an inward rotation limiter of the fixed portion of the magnetic leg, the inward rotation of the pivoting portion during the landing and the takeoff.

In an embodiment consistent with the method described above, the method further comprises: landing the UAV on a flat surface using the magnetic legs; passively orienting, for each magnetic leg using the single articulation joint with the single degree of freedom about the pivot axis, the pivoting portion flat and parallel to the flat surface in response to the pivoting portion contacting the flat surface during the landing on the flat surface; taking off with the UAV from the flat surface; and passively maintaining, for each magnetic leg using the articulation joint and with the center of gravity of the pivoting portion being on an inward side of the pivot axis, the flat orientation of the pivoting portion during the takeoff from the flat surface.

In an embodiment consistent with the method described above, the method further comprises limiting, for each magnetic leg using an outward rotation limiter of the fixed portion of the magnetic leg, the outward rotation of the pivoting portion to a mostly flat orientation during the landing on and the takeoff from the flat surface.

In an embodiment consistent with the method described above, the method further comprises, for each magnetic leg, measuring a pivot of the pivoting portion about the pivot axis after the pivoting portion contacts the cylindrical surface using an angle rotation sensor of the magnetic leg.

In an embodiment consistent with the method described above, the method further comprises determining, by a control circuit of the UAV, when to switch on the magnets of the magnetic legs at the end of the landing using the measured pivots of the pivoting portions of the magnetic legs.

In an embodiment consistent with the method described above, the method further comprises for each magnetic leg, actuating the magnet, using a switch actuator of the pivoting portion and coupled to a top of the magnet, in order to switch the magnet between on and off, and controlling, by the control circuit, the switch actuator to switch on the magnet when the measured pivots of the pivoting portions of the magnetic legs are the same inward angle.

In an embodiment consistent with the method described above, the method further comprises determining, by a control circuit of the UAV, the diameter of a cylinder corresponding to the cylindrical surface using the measured pivots of the pivoting portions of the magnetic legs.

In an embodiment consistent with the method described above, the method further comprises determining, by a control circuit of the UAV, a distance from the body to the cylindrical surface using the measured pivots of the pivoting portions of the magnetic legs.

Any combinations of the various embodiments and implementations disclosed herein can be used. These and other aspects and features can be appreciated from the following description of certain embodiments together with the accompanying drawings and claims.

BRIEF DESCRIPTION OF THE DRAWINGS

FIGS. 3C-3D illustrate the articulated magnetic leg of FIGS. 3A-3B making initial and final contacts, respectively, of a flat surface.

FIGS. 4A-4B illustrate an example articulated magnetic leg of a UAV prior to take off from flat and curved surfaces, respectively, according to an embodiment.

FIG. 5A illustrates an example UAV having articulated magnetic legs landing in a centered orientation on a pipe, according to an embodiment.

FIGS. 5B-5C illustrate the UAV of FIG. 5A landing in a non-centered orientation on the pipe, making initial and final contacts, respectively.

FIG. 7 is a flow diagram of an example method of landing, taking off, and magnetically perching a UAV on a ferromagnetic cylindrical surface, according to an embodiment.

It is noted that the drawings are illustrative and not necessarily to scale, and that the same or similar features have the same or similar reference numerals throughout.

DETAILED DESCRIPTION OF CERTAIN EMBODIMENTS OF THE DISCLOSURE

Figures 1A, 1B:
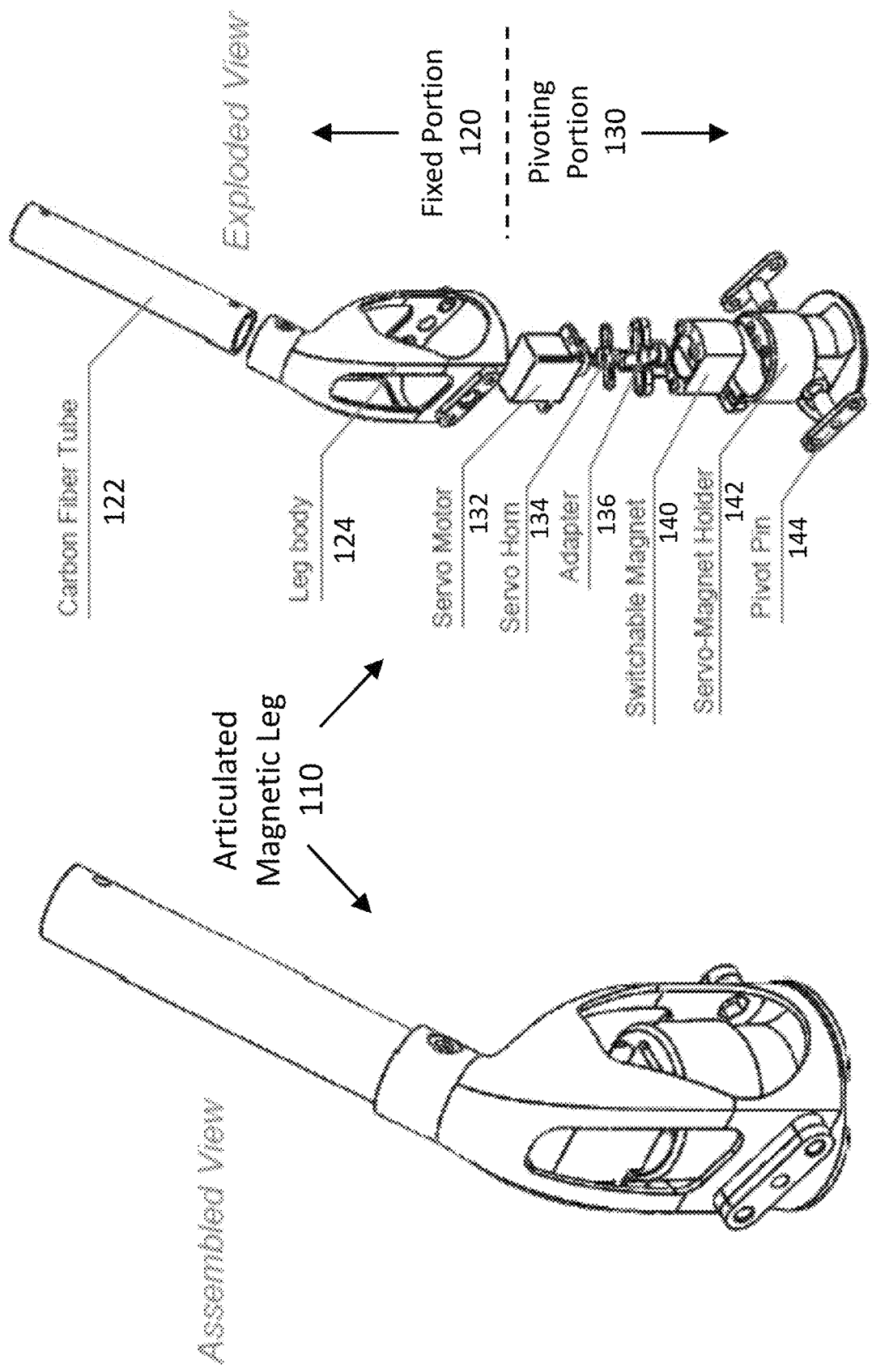
FIGS. 1A-1B illustrate assembled and exploded views, respectively, of an example articulated magnetic leg for landing an unmanned aerial vehicle (UAV) or drone on a curved surface, according to an embodiment.

Example embodiments of the present disclosure are directed to a mechanical system design that enables an unmanned aerial vehicle (UAV or drone) to use switchable magnetic legs in order to magnetically land or perch on both curved ferromagnetic surfaces (such as carbon steel pipes) and flat ferromagnetic surfaces (such as a home base or base of operations, or the tops of many structures such as storage tanks). Some such embodiments utilize switchable magnets and constrained joints to, for example, help improve stability and reduce wobbling during takeoff and landing. In some such example embodiments, these features provide for a bi-stable design (e.g., exhibiting stability during takeoff from and landing on both curved surfaces and flat surfaces). This bi-stability provides for less oscillation during flight. In some example embodiments, one or more angle rotation sensors are provided to, for example, determine pipe diameter after contact when landing or perching on carbon steel pipes.

As discussed earlier, one of the top challenges in the oil and gas industry is the periodic inspection of elevated assets found in refineries, gas plants, offshore platforms, and other plants and facilities. These assets include high-elevation pipes and structures which are difficult to access during inspection jobs. While UAVs can be employed to help with the access, landing on such structures with a UAV poses its own set of obstacles. For example, these structures are often elevated pipes, having relatively narrow diameters (for example, six inches). Landing, taking off, and perching on such curved surfaces can be a difficult task for a UAV.

Accordingly, in example embodiments, systems and methods are provided for an effective way that allows drones (e.g., battery-powered drones or UAVs) to magnetically land and perch on these assets in order to, for example, perform inspection tasks while saving battery energy. In example embodiments, the UAVs include switchable magnetic legs that allow the UAVs to magnetically perch on ferromagnetic surfaces after landing and before takeoff. This allows such UAVs to, for example, preserve their battery power by landing on pipes instead of hovering during missions that require long time (such as surveillance or monitoring for gas leaks), perform jobs that require contact with the pipe such as inspection (e.g., ultrasonic, magnetic) or light maintenance (e.g., coating), and deliver payloads to the pipe (such as small sensing devices and crawlers) or retrieve samples (such as corrosion coupons). Example embodiment provide for a UAV to land on operational assets found in oil and gas facilities such as pipes, vessels, and structures. In some such embodiments, magnetic attachment (e.g., switchable magnetic legs) is employed by the UAV since most of these assets are made of carbon steel.

According to various embodiments, a UAV is provided having passively articulated landing legs with embedded switchable magnets. These magnets are selectively turned on or off, which facilitates easy detachment during take-off from the pipe by switching the magnet off. According to some embodiments, a magnetic perching mechanism is provided, such as part of a UAV. The mechanism tolerates landing on various pipe diameters (such as six inches and larger) and misalignment due to imperfect landing (e.g., up to 15°, or in some cases, 20°, off from vertical). The mechanism uses landing legs that are lightweight (such as light as possible or practical) since payload weight is an important restriction of most UAVs. There are numerous variations of the UAV and articulated magnetic legs, example embodiments of which are illustrated in FIGS. 1A-6B and described in the text that follows.

FIGS. 1A-1B illustrate assembled and exploded views, respectively, of an example articulated magnetic leg 110 for landing an unmanned aerial vehicle (UAV) or drone on a curved ferromagnetic surface (such as a carbon steel pipe), according to an embodiment. For instance, the drone or UAV may have four or six such magnetic legs 110, such as one for each propeller of the drone.

With reference to the exploded view of FIG. 1B, the magnetic leg 110 includes a fixed portion 120 that normally remains fixed and attaches the magnetic leg 110 to the main body (or just body) of the UAV. The fixed portion 120 includes a fixed leg body 124 rigidly attached to the drone through a carbon fiber tube 122. The leg body 124 holds a rotating holder (also referred to as a pivoting portion 130) that houses a switchable magnet 140 and acts as one of the drone's feet. A single degree of freedom (such as inward-to-outward with respect to the drone's body) allows the magnetic leg 110 to adapt to any inward surface curvature (such as for pipes six inches or larger), including a flat surface. For example, a pivot pin 144 can serve as an inward rotation axle that allows the pivoting portion 130 to rotate inwardly with one degree of freedom about a pivot axis coinciding with the rotation axle.

In one or more embodiments, the switchable magnet 140 includes two stacked disk magnets, one static and one rotatable (such as the top disk magnet). The rotatable disk magnet is rotated or oriented to one of two positions. In a first position, the rotatable disk magnet cancels the other disk magnet's magnetic field, which effectively switches off the magnetism of the switchable magnet 140. In a second position (e.g., rotated 180° from the first position), the rotatable disk magnet is oriented the same way as the other disk magnet's magnetic field, which intensifies the total magnetism and switches on the switchable magnet 140.

In order to perform this disk magnet rotation, an actuator such as a servo motor 132 is used. The servo motor 132 is capable of rotating the rotatable disk magnet through a mechanical coupling (such as a servo horn 134 and an adapter 136) A servo-magnet holder 142 holds the top disk magnet and has embedded rotation limiters to limit the rotatable disk magnet (e.g., the top disk magnet) to 180 degrees. This limitation allows the servo motor rotation direction to be linked with switching on or off the switchable magnet 140. In some other embodiments, different types of switchable magnets are used, such as electromagnets or electro-permanent magnets.

The switchable magnet 140 of each magnetic leg 110 is switched on at some point in the landing maneuver. For example, this switching can take place at the beginning of the landing while the UAV is approaching the landing target (e.g., pipe), or at the end of the landing after the feet (e.g., pivoting portions 130) settle after touching down on the pipe. To activate the switching, in one embodiment, an onboard controller (on the drone) is programmed or otherwise configured to a signal to the servo motor 132 to allow the UAV to stick to (or magnetically perch on) the pipe. When the time comes to takeoff (such as at the beginning of the takeoff), the switchable magnets 140 are switched off (e.g., by the onboard controller that is further programmed to send such a signal to the servo motor 132). This makes the propeller's job easier and avoids the need to overcome the magnetic pull force while taking off.

Figures 2A, 2B:
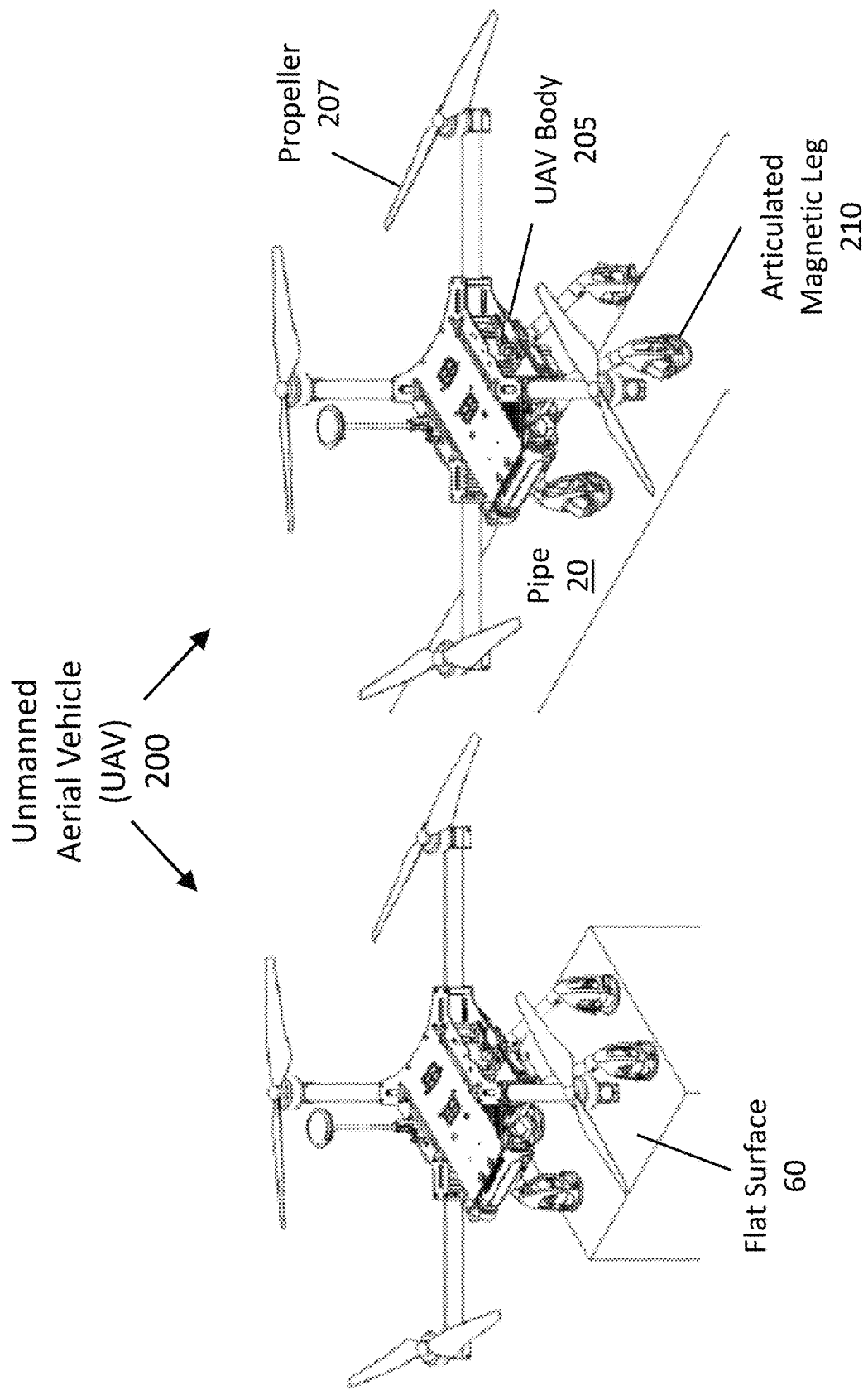
FIGS. 2A-2B illustrate an example UAV having articulated magnetic legs landing on flat and curved surfaces, respectively, according to an embodiment.

FIGS. 2A-2B illustrate an example UAV 200 having articulated magnetic legs 210 landing on flat and curved surfaces (e.g., flat surface 60 and pipe 20), respectively, according to an embodiment. The UAV 200 includes a body (or UAV body) 205 to which the articulated magnetic legs 210 (in this case, four such legs) are attached. The UAV 200 also includes a plurality of propellers 207 attached to the body 205. In different embodiments, the number of articulated magnetic legs can vary (such as six) and the number of propellers can vary (such as six). In some embodiments, the number of articulated magnetic legs is the same as the number of propellers. In some embodiments, the articulated magnetic legs are arranged symmetrically about a longitudinal (e.g., lengthwise) axis of the UAV. For ease of description throughout, the number of articulated magnetic legs of the UAV is four, the number of propellers of the UAV is four, and the articulated magnetic legs are arranged symmetrically about the longitudinal axis of the UAV. Other embodiments are not necessarily so limited.

FIGS. 2A-2B show the UAV 200 that has landed on two different surfaces, namely a flat surface 60 (such as a home base or the top of a vertically-arranged cylinder) and a curved pipe 20 (such as a carbon steel pipe or the top of a horizontally-arranged cylinder or cylindrically curved portion of a structure), respectively. Here, "top" is in reference to gravity, and the articulated magnetic legs 210 of the UAV 200 in FIG. 2B are arranged symmetrically about the top of the pipe 20 (e.g., about a longitudinal axis of the top of the pipe 20). In some embodiments, the articulated magnetic legs 210 adapt to allow landings on any pipe diameter larger than six inches. That is, the articulated magnetic legs 210 are adaptable (e.g., can land securely on with all articulated magnetic legs 210) to multiple diameters of pipe.

Figures 3A, 3B:
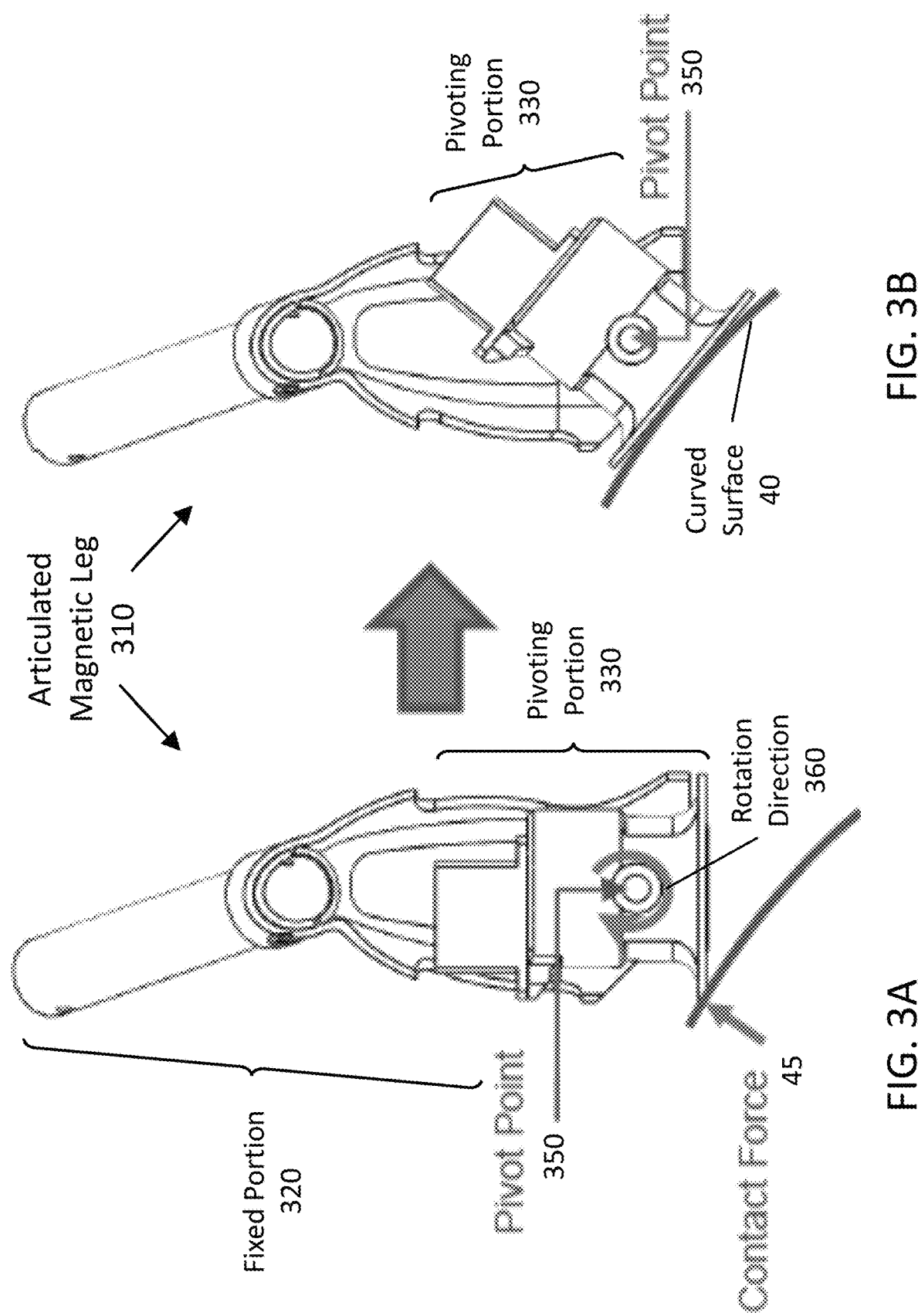
FIGS. 3A-3B illustrate an example articulated magnetic leg of a UAV making initial and final contacts, respectively, of a curved surface (such as a pipe), according to an embodiment.

FIGS. 3A-3B illustrate an example articulated magnetic leg 310 of a UAV (such as UAV 200) making initial and final contacts, respectively, of a curved surface 40 (such as a pipe or other partial or fully cylindrically curved surface having a radius of curvature, as in pipe 20), according to an embodiment. FIGS. 3C-3D illustrate the articulated magnetic leg 310 of FIGS. 3A-3B making initial and final contacts, respectively, of a flat surface 60. The articulated magnetic leg 310 includes a fixed portion 320 (coupled to the body of a UAV) and a pivoting portion 330 coupled to the fixed portion 320 through a pivot point 350 (e.g., a pivot axis defining a single degree of freedom rotation of the pivoting portion 330 with respect to the fixed portion 320, as in pivot pin 144).

Here, with reference to FIGS. 3A-3B, the pivot axis 350 is parallel to the longitudinal axis of the UAV in order to impart an inward (or outward) rotation of the pivoting portion 330 with respect to the curved surface 40 when the longitudinal axis of the UAV is aligned with or parallel to a longitudinal axis of the pipe or other cylindrically curved surface. Accordingly, the initial contact of the pivoting portion 330 with the curved surface 40 causes a contact force 45 to be imparted on the pivoting portion 330. This in turn causes a corresponding clockwise rotation 360 (inward) of the pivoting portion 330 about the pivot axis 350. The inward rotation 360 continues until the pivoting portion (or more specifically, the bottom of the pivoting portion) 330 is tangent to the curved surface 40 at a final contact of the pivoting portion 330 with the curved surface 40.

In addition, and with reference to FIGS. 3C-3D, the pivot axis is parallel to the flat surface 60. Accordingly, the initial contact of the pivoting portion 330 with the flat surface 60 causes a contact force 65 to be imparted on the pivoting portion 330. This in turn causes a corresponding counterclockwise rotation 360 (downward) of the pivoting portion 330 about the pivot axis 350. The downward rotation 360 continues until the pivoting portion (or more specifically, the bottom of the pivoting portion) 330 aligns with the flat surface 60 at a final contact of the pivoting portion 330 with the flat surface 60.

The legs 310 have one degree of freedom around the pivot axis 350 (or pivot point) shown in FIGS. 3A-3D to allow them to rotate and adapt to surfaces with different curvatures. Upon contact when the leg 310 rotates to face a flat surface, the leg 310 keeps pointing that way even after detachment. Similarly, when the leg 310 rotates to face the curved surface or a small pipe, the leg 310 keeps pointing to that direction even after detachment. This makes the joint stable in these two positions (e.g., bi-stable), reducing oscillations and wobbling in the leg joint during flight.

In further detail, and with reference to FIGS. 3A-3B, when the leg 310 contacts the curved surface 40 at a contact point, the surface 40 pushes the leg 310 (and in particular, the pivoting portion 330) at the contact point. This causes the pivoting portion 330 to rotate along or about its pivot axis 350 up until the pivoting portion 330 faces (e.g., is tangent to) the surface 40. The contact force 45 generates a rotating torque in the correct direction (in this case, clockwise) 360 due to the flat design of the bottom contact surface of the pivoting portion 330 of the leg 310.

By contrast, and with reference to FIGS. 3C-3D, the leg 310 (and, in particular, the pivoting portion 330) contacts the flat surface 60 at a contact point. In addition, the flat bottom of the pivoting portion 330 is not parallel to the flat surface 60. Accordingly, the rotating portion 330 of the leg 310 rotates (in this case, counterclockwise 365) around or about its pivot axis 350 until the flat bottom of the rotating portion 330 faces the flat surface 60. This is due to the pushing force 65 from the surface 60 at the contact point. This contact force 65 generates a (counterclockwise) rotating torque in the correct (counterclockwise) direction 365 due to the flat design of the bottom contact surface of the pivoting portion 330 of the leg 310.

FIGS. 4A-4B illustrate an example articulated magnetic leg 410 of a UAV (such as UAV 200) prior to take off from flat and curved surfaces (such as flat surface 60 and curved surface 40), respectively, according to an embodiment. The leg 410 (and more specifically, the pivoting portion 430) has only one degree of freedom, namely inward (e.g., clockwise or rotation direction 460 as shown in FIG. 4B) or outward (e.g., counterclockwise or rotation direction 465 as shown in FIG. 4A) around a pivot point (or about a pivot axis) 450 to allow the leg 410 to land flat on flat surfaces or tangent to curved surfaces. These curved surfaces can include different size (or diameter) pipes with corresponding different curvatures (or radii of curvature).

The leg 410 has two stable positions and is thus sometimes referred to as bi-stable. When the leg 410 rotates to face a flat surface (e.g., as shown in FIGS. 3C-3D), the leg 410 keeps pointing that way even during and after detachment (e.g., as part of taking off from the flat surface). Similarly, when the leg 410 rotates to face a curved surface or a small pipe (e.g., as shown in FIGS. 3A-3B), the leg 410 keeps pointing in that direction even after during and after detachment (e.g., as part of taking off from the curved surface or small pipe). This makes the joint (e.g., pivoting portion 430) stable in these two positions (bi-stable), which helps reduce oscillations and wobble in the leg joint during flight.

In further detail, when landing on a flat surface, the leg 410 remains in a vertical orientation (e.g., bottom of pivoting portion 430 is parallel to the flat surface) even after takeoff. This is due to a servo motor 432 being located off-centered on a top of the pivoting portion 430. The servo motor 432 is off-centered with respect to the pivot axis 450, such that the servo motor center of gravity 485 is shifted to the left of the pivot axis 450 (while the center of gravity of the remainder of the pivoting portion 430 remains centered with respect to the pivot axis 450). The leftward shift of the center of gravity of the servo motor 432 causes the leg 410 to rotate outwardly (in a counterclockwise direction 465 as illustrated in FIG. 4A).

However, the fixed portion of the leg 410 (e.g., the leg frame) acts as a rotation limiter 475 to prevent the pivoting portion 430 from rotating much further in this direction. For instance, the rotation limiter 475 prevents the pivoting portion 430 from rotating more than a few degrees (e.g., no more than three degrees, or no more than five degrees) in an outward direction, effectively keeping the bottom of the pivoting portion 480 mostly flat during the takeoff from the flat portion. In some embodiments, the same effect is achieved by keeping the center of gravity of the pivoting portion 430 on the inward side of the pivot axis 450 when perching and taking off from a flat surface. In some such embodiments, the center of gravity of the pivoting portion is also above the pivot axis 450 when perching and taking off from the flat surface. Here, directions such as "above" are with respect to a gravity direction.

Furthermore, when landing on a curved surface, the contact force from the surface on the bottom part of the leg 410 creates a torque that causes the leg 410 to rotate and achieve the rotated (inward) orientation shown in FIG. 4B.

The leg 410 remains in this orientation even after takeoff because the center of gravity 480 of the servo motor 432 (or the center of gravity of the pivoting portion 430) has shifted to an outward side of the pivot axis 450 (and in some embodiments, above the pivot axis 450) such that the weight creates an opposite torque (in a clockwise direction 460 as illustrated in FIG. 4B), keeping the pivoting portion 430 in this (inward) orientation. Here, the fixed portion of the leg 410 (e.g., the leg body) also acts as a rotation range limiter 470 to prevent excessive (inward) rotation. For example, in some embodiments, the rotation limiter 470 limits inward rotation to no more than 45°, while in some other embodiments, the rotation limiter 470 limits inward rotation to no more than 60°.

FIG. 5A illustrates an example UAV 500 having articulated magnetic legs 510 landing in a centered orientation on a pipe 20, according to an embodiment. FIGS. 5B-5C illustrate the UAV 500 of FIG. 5A landing in a non-centered orientation on the pipe 20, making initial and final contacts, respectively. In some embodiments, measuring the rotation angle of the legs 510 due to their singular degree of freedom before or after contacting a surface (such as the pipe 20) is done through rotation angle sensors such as a potentiometer, rotary encoder, or shaft encoder in each magnetic leg 510. Determining the rotation angle of each leg 510 helps with determining an orientation of the legs 510 or the UAV 500 with respect to the surface. In some embodiments, the rotation angle sensors measure the angular rotation of the pivoting portions of the legs 510 with respect to gravity, while in some embodiments, the rotation angle sensors measure the angular rotation of the pivoting portions of the legs 510 with respect to the fixed portions of the legs 510. In some such embodiments, the rotation angle sensors measure the angular rotation of the pivoting portions of the legs 510 with respect to both gravity and the fixed portions of the legs 510.

For example, in some embodiments, rotation angle sensors are implemented on the legs 510, with control circuitry provided to signal if all of them have the same orientation (e.g., the same measured inward angles of their pivoting portions) when lending on a surface before switching on the switchable magnets of the magnetic legs 510. This helps detect situations where one or more legs are not touching the surface or not touching the surface at the appropriate (inward) angle, which are indicative of an incomplete or imperfect landing attempt on the surface. In some embodiments, this indication of the same inward angle is further combined with a level sensor in the body of the UAV 500 to detect in the body of the UAV 500 is level with respect to gravity.

For example, the pivoting portions of the legs 510 of the UAV 500 of FIG. 5B are not at the same angular rotation, which indicates a problem with the landing (in this case, the UAV 500 is off-centered with respect to the top of the pipe 20). If the UAV 500 continues to land to try to force the pivoting portions to have the same angular rotation, at least with respect to the fixed portions, as in FIG. 5C, the UAV 500 is no longer level with respect to gravity. This can be detected with, for example, a level sensor in the body of the UAV 500, or rotation angle sensors in the legs 510 that measure angular rotation of the pivoting portions with respect to gravity. At this point, in some embodiments, automated control circuitry is programmed to determine the amount of off-center, and whether to re-attempt the landing or if the amount of off-center is within a tolerance of a safe landing (such as 10 degrees, 15 degrees, or 20 degrees off-center).

Figures 6A, 6B:
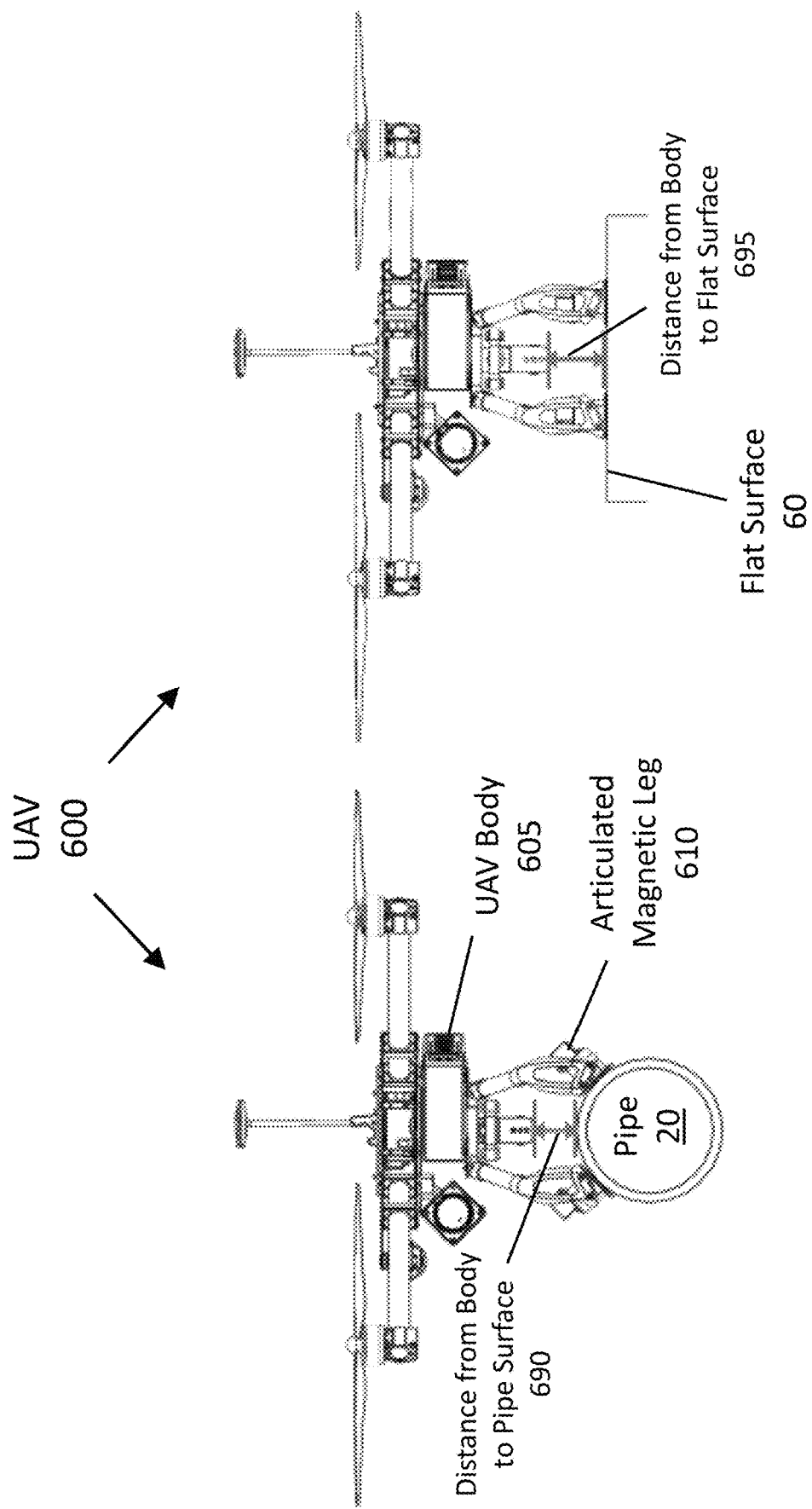
FIGS. 6A-6B illustrate an example UAV having articulated magnetic legs landing on flat and curved surfaces, respectively, according to an embodiment.

FIGS. 6A-6B illustrate an example UAV 600 having articulated magnetic legs 610 landing on flat and curved surfaces (pipe 20 and flat surface 60), respectively, according to an embodiment. The legs 610 are coupled to a UAV body 605. Here, rotation angle sensors in the legs 610 are used to measure the curvature of the surface that the legs 610 land on. In some embodiments, measurement is used to determine the distance between the body 605 (or top of the legs 610, or bottom of payload) and the surface. Based upon this distance, the amount that a payload of the UAV 600 needs to be lowered (e.g., from the body 605, such as distance 690 to the pipe 20 or the distance 695 to the flat surface 60) to the surface can be established. Determining this distance can be especially useful when a controller is used (e.g., configured by code) to deploy the payload through a feedback loop between the controller and the sensors.

With reference to FIGS. 1A-6B, in some example embodiments, an unmanned aerial vehicle (UAV, such as UAV 200, 500, or 600) that lands, takes off, and magnetically perches on a ferromagnetic cylindrical surface (such as pipe 20 or curved surface 40) is provided. The UAV includes a body (such as UAV body 205 or 605) and a plurality (such as four or six) of articulated magnetic legs (such as articulated magnetic legs 110, 210, 310, 410, 510, or 610). The magnetic legs land the UAV on the ferromagnetic cylindrical surface and magnetically perch the UAV on the ferromagnetic cylindrical surface after the landing. Each magnetic leg has a fixed portion (such as fixed portion 120 or 320) coupled to the UAV body and a pivoting portion (such as pivoting portion 130, 330, or 430) pivotably coupled to the fixed portion at a pivot axis (such as pivot pin 144 or pivot axis 305 or 405).

The pivoting portion includes a switchable magnet (such as switchable magnet 140) whose magnetism is switched on to magnetically attach the UAV to the ferromagnetic cylindrical surface at an end of the landing and throughout the perching, and switched off to magnetically detach the UAV from the ferromagnetic cylindrical surface at a beginning of the takeoff. The pivoting portion further includes only a single articulation joint (such as pivot pin 144) that provides the pivoting portion with only a single degree of freedom (such as inward and outward) about the pivot axis in order to passively orient the pivoting portion inward and tangent to the cylindrical surface in response to the pivoting portion contacting the cylindrical surface during the landing. The single articulation joint with the single degree of freedom also passively maintain the inward orientation of the pivoting portion during the takeoff.

In an embodiment, the fixed portion of each magnetic leg includes an inward rotation limiter (such as rotation limiter 470) that limits the inward rotation of the pivoting portion during the landing and the takeoff. In an embodiment, the UAV lands on and takes off from a flat surface (such as flat surface 60). In addition, the articulation joint of each magnetic leg further provides the pivoting portion with the single degree of freedom about the pivot axis in order to passively orient the pivoting portion flat and parallel to the flat surface in response to the pivoting portion contacting the flat surface during the landing on the flat surface. Further, the articulation joint with the single degree of freedom also passively maintain the flat orientation of the pivoting portion during the takeoff from the flat surface.

In an embodiment, the fixed portion of each magnetic leg includes an outward rotation limiter (such as rotation limiter 475) to limit the outward rotation of the pivoting portion to a mostly flat (such as within a few degrees of flat, as in no more than three degrees or no more than five degrees off from flat) orientation during the landing on and the takeoff from the flat surface. In an embodiment, the pivoting portion of each magnetic leg further includes a switch actuator (such as servo motor 132 or 432) at a top of the switchable magnet. The switch actuator actuates the magnet in order to switch the magnet between on and off. In addition, the center of gravity of the switch actuator is on an outward side (such as center of gravity 480) of the pivot axis during the takeoff from the cylindrical surface, and on an inward side (such as center of gravity 485) of the pivot axis during the takeoff from the flat surface.

In an embodiment, each magnetic leg further includes an angle rotation sensor that measures a pivot of the pivoting portion about the pivot axis after the pivoting portion contacts the cylindrical surface. In an embodiment, the UAV further includes a control circuit configured (such as programmed by code) to determine when to switch on the magnets of the magnetic legs at the end of the landing using the measured pivots of the pivoting portions of the magnetic legs to make the determination. In an embodiment, for each magnetic leg, the pivoting portion includes a switch actuator coupled to a top of the magnet and that actuates the magnet in order to switch the magnet between on and off. The control circuit is further configured (such as by code) to control the switch actuator to switch on the magnet when the measured pivots of the pivoting portions of the magnetic legs are the same inward angle.

In an embodiment, the UAV further includes a control circuit configured by code to determine the diameter of a cylinder corresponding to the cylindrical surface using the measured pivots of the pivoting portions of the magnetic legs. In an embodiment, the UAV further includes a control circuit configured by code or other programmable logic to determine a distance (such as distance 690) from the body to the cylindrical surface using the measured pivots of the pivoting portions of the magnetic legs. In an embodiment, the ferromagnetic cylindrical surface is part of a carbon steel pipe or vessel (such as a storage tank).

The described techniques herein can be implemented using a combination of sensors, cameras, and other devices including computing or other logic circuits configured (e.g., programmed) to carry out their assigned tasks. These devices are located on or in (or otherwise in close proximity to) the body or legs of the UAV for carrying out the techniques. In some example embodiments, the control logic is implemented as computer code configured to be executed on a computing circuit (such as a microprocessor) to perform the control steps that are part of the technique.

FIG. 7 is a flow diagram of an example method 700 of landing, taking off, and magnetically perching a UAV (such as UAV 200, 500, or 600) on a ferromagnetic cylindrical surface (such as pipe 20 or curved surface 40), according to an embodiment. The UAV includes a body (such as UAV body 205 or 605) and a plurality of articulated magnetic legs (such as magnetic legs 110, 210, 310, 410, 510, or 610). Each leg has a fixed portion (such as fixed portion 120 or 320) coupled to the body and a pivoting portion (such as pivoting portion 130, 330, or 430) pivotably coupled to the fixed portion at a pivot axis (such as pivot axis 350 or 450). The pivot portion includes a switchable magnet (such as switchable magnet 140) and a single articulation joint (such as pivot pin 144) having a single degree of freedom (such as inward or outward) about the pivot axis.

Some or all of the method 700 can be performed using components and techniques illustrated in FIGS. 1A-6B. In addition, portions of this and other methods disclosed herein can be performed on or using a custom or preprogrammed logic device, circuit, or processor, such as a programmable logic circuit (PLC), computer, software, or other circuit (e.g., ASIC, FPGA) configured by code or logic to carry out their assigned task. The device, circuit, or processor can be, for example, a dedicated or shared hardware device (such as a laptop, a single board computer (SBC), a workstation, a tablet, a smartphone, part of a server, or a dedicated hardware circuit, as in an FPGA or ASIC, or the like), or computer server, or a portion of a server or computer system. The device, circuit, or processor can include a non-transitory computer readable medium (CRM, such as read-only memory (ROM), flash drive, or disk drive) storing instructions that, when executed on one or more processors, cause portions of the method 700 (or other disclosed method) to be carried out. It should be noted that in other embodiments, the order of the operations can be varied, and that some of the operations can be omitted. Some of the method 700 can also be performed using logic, circuits, or processors located on or in electrical communication with a processing circuit configured by code to carry out these portions of the method 700.

In the method 700, processing begins with the step of landing 710 the UAV on the ferromagnetic cylindrical surface using the magnetic legs. The method 700 further includes the step of passively orienting 720, for each magnetic leg using the single articulation joint with the single degree of freedom about the pivot axis, the pivoting portion inward and tangent to the cylindrical surface in response to the pivoting portion contacting the cylindrical surface during the landing. See, for example, FIGS. 3A-3B. In addition, the method 700 includes the step of magnetically attaching 730 the UAV to the ferromagnetic cylindrical surface at an end of the landing by switching on the switchable magnet in each magnetic leg. In some embodiments, a servo motor (such as servo motor 132 or 432) is used to rotate stacked disk magnets of a switchable magnet in order to turn on the switchable magnet.

Continuing, the method 700 includes the step of magnetically perching 740 the UAV on the ferromagnetic cylindrical surface after the landing using the magnetic legs while their respective switchable magnets remain switched on. The method 700 further includes the steps of magnetically detaching 750 the UAV from the ferromagnetic cylindrical surface at a beginning of the takeoff by switching off the switchable magnet in each magnetic leg, and taking off 760 with the UAV from the cylindrical surface after the perching. In addition, the method 700 includes the step of passively maintaining 770, for each magnetic leg using the articulation joint and with the center of gravity of the pivoting portion being on an outward side of the pivot axis (such as in FIG. 4B), the inward orientation of the pivoting portion during the takeoff.

In some embodiments, the method 700 includes the step of limiting, for each magnetic leg using an inward rotation limiter (such as rotation limiter 470) of the fixed portion of the magnetic leg, the inward rotation of the pivoting portion during the landing and the takeoff. In some embodiments, the method 700 includes the steps of: landing the UAV on a flat surface (such as flat surface 60) using the magnetic legs; passively orienting, for each magnetic leg using the single articulation joint with the single degree of freedom about the pivot axis, the pivoting portion flat and parallel to the flat surface in response to the pivoting portion contacting the flat surface during the landing on the flat surface (such as shown in FIGS. 3C-3D); taking off with the UAV from the flat surface; and passively maintaining, for each magnetic leg using the articulation joint and with the center of gravity of the pivoting portion being on an inward side of the pivot axis, the flat orientation of the pivoting portion during the takeoff from the flat surface.

In some embodiments, the method 700 includes the step of limiting, for each magnetic leg using an outward rotation limiter (such as rotation limiter 475) of the fixed portion of the magnetic leg, the outward rotation of the pivoting portion to a mostly flat (such as at most three degrees or at most five degrees) orientation during the landing on and the takeoff from the flat surface. In some embodiments, the method 700 includes the step of, for each magnetic leg, measuring a pivot of the pivoting portion about the pivot axis after the pivoting portion contacts the cylindrical surface using an angle rotation sensor of the magnetic leg. In some embodiments, the method 700 includes the step of determining, by a control circuit of the UAV, when to switch on the magnets of the magnetic legs at the end of the landing using the measured pivots of the pivoting portions of the magnetic legs.

In some embodiments, the method 700 includes the step of, for each magnetic leg, the actuating the magnet, using a switch actuator (such as servo motor 132 or 432) of the pivoting portion and coupled to a top of the magnet, in order to switch the magnet between on and off, and controlling, by the control circuit, the switch actuator to switch on the magnet when the measured pivots of the pivoting portions of the magnetic legs are the same inward angle. In some embodiments, the method 700 includes the step of determining, by a control circuit of the UAV, the diameter of a cylinder (such as pipe 20 or cylindrically curved surface 40 having a radius of curvature) corresponding to the cylindrical surface using the measured pivots of the pivoting portions of the magnetic legs. In some embodiments, the method 700 includes the step of determining, by a control circuit of the UAV, a distance (such as distance 690) from the body to the cylindrical surface using the measured pivots of the pivoting portions of the magnetic legs.

The methods described herein may be performed in part by software or firmware in machine readable form on a tangible (e.g., non-transitory) storage medium. For example, the software or firmware may be in the form of a computer program including computer program code adapted to perform some of the steps of any of the methods described herein when the program is run on a computer or suitable hardware device (e.g., FPGA), and where the computer program may be embodied on a computer readable medium. Examples of tangible storage media include computer storage devices having computer-readable media such as disks, thumb drives, flash memory, and the like, and do not include propagated signals. Propagated signals may be present in a tangible storage media, but propagated signals by themselves are not examples of tangible storage media. The software can be suitable for execution on a parallel processor or a serial processor such that the method steps may be carried out in any suitable order, or simultaneously.

It is to be further understood that like or similar numerals in the drawings represent like or similar elements through the several figures, and that not all components or steps described and illustrated with reference to the figures are required for all embodiments or arrangements.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to a viewer. Accordingly, no limitations are implied or to be inferred. In addition, the use of ordinal numbers (e.g., first, second, third) is for distinction and not counting. For example, the use of "third" does not imply there is a corresponding "first" or "second." Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. An unmanned aerial vehicle (UAV) configured to land, take off, and magnetically perch on a ferromagnetic cylindrical surface, the UAV comprising:
   a body; and
   a plurality of articulated magnetic legs configured to land the UAV on the ferromagnetic cylindrical surface and to magnetically perch the UAV on the ferromagnetic cylindrical surface after the landing, each magnetic leg having a fixed portion coupled to the body and a pivoting portion pivotably coupled to the fixed portion at a pivot axis, the pivoting portion having a center of gravity with respect to the pivot axis and comprising:
      a flat bottom contact surface for contacting the cylindrical surface during the landing and maintaining the contact with the cylindrical surface throughout the perching;
      a switchable magnet whose magnetism is switched on to magnetically attach the UAV to the ferromagnetic cylindrical surface at an end of the landing and throughout the perching, and switched off to magnetically detach the UAV from the ferromagnetic cylindrical surface at a beginning of the takeoff; and
      a single articulation joint configured to provide the pivoting portion and the center of gravity with a single degree of freedom about the pivot axis in order to passively orient (1) the flat bottom contact surface inward and tangent to the cylindrical surface and (2) the center of gravity to an outward side of the pivot axis, in response to the flat bottom contact surface contacting the cylindrical surface during the landing, and to passively maintain the inward orientation of the flat bottom contact surface and the outward orientation of the center of gravity during the takeoff,
   wherein each magnetic leg comprises an angle rotation sensor configured to measure a pivot of the pivoting portion about the pivot axis after the flat bottom contact surface contacts the cylindrical surface, and wherein the UAV further comprises a control circuit configured to use the measured pivots of the pivoting portions of the magnetic legs to determine (1) the diameter of a cylinder corresponding to the cylindrical surface or (2) a distance from the body to the cylindrical surface.

2. The UAV of claim 1, wherein the fixed portion of each magnetic leg comprises an inward rotation limiter configured to limit an inward rotation of the flat bottom contact surface and an outward rotation of the center of gravity during the landing and the takeoff.

3. The UAV of claim 1, wherein the UAV is further configured to land on and take off from a flat landing surface, and the articulation joint of each magnetic leg is further configured to provide the pivoting portion and the center of gravity with the single degree of freedom about the pivot axis in order to passively orient (1) the flat bottom contact surface parallel to the flat landing surface and (2) the center of gravity to an inward side of the pivot axis in response to the flat bottom contact surface contacting the flat landing surface during the landing on the flat landing surface, and to passively maintain the flat orientation of the flat bottom contact surface and the inward orientation of the center of gravity during the takeoff from the flat landing surface.

4. The UAV of claim 3, wherein the fixed portion of each magnetic leg comprises an outward rotation limiter to limit an outward rotation of the flat bottom contact surface to a mostly flat orientation and to limit an inward rotation of the center of gravity, during the landing on and the takeoff from the flat landing surface.

5. The UAV of claim 3, wherein the pivoting portion of each magnetic leg further comprises a switch actuator at a top of the switchable magnet and configured to actuate the magnet in order to switch the magnet between on and off, a center of gravity of the switch actuator being on the outward side of the pivot axis during the takeoff from the cylindrical surface, and on the inward side of the pivot axis during the takeoff from the flat landing surface.

6. An unmanned aerial vehicle (UAV) configured to land, take off, and magnetically perch on a ferromagnetic cylindrical surface, the UAV comprising:
a body; and
a plurality of articulated magnetic legs configured to land the UAV on the ferromagnetic cylindrical surface and to magnetically perch the UAV on the ferromagnetic cylindrical surface after the landing, each magnetic leg having a fixed portion coupled to the body and a pivoting portion pivotably coupled to the fixed portion at a pivot axis, the pivoting portion having a center of gravity with respect to the pivot axis and comprising:
a flat bottom contact surface for contacting the cylindrical surface during the landing and maintaining the contact with the cylindrical surface throughout the perching;
a switchable magnet whose magnetism is switched on to magnetically attach the UAV to the ferromagnetic cylindrical surface at an end of the landing and throughout the perching, and switched off to magnetically detach the UAV from the ferromagnetic cylindrical surface at a beginning of the takeoff; and
a single articulation joint configured to provide the pivoting portion and the center of gravity with a single degree of freedom about the pivot axis in order to passively orient (1) the flat bottom contact surface inward and tangent to the cylindrical surface and (2) the center of gravity to an outward side of the pivot axis, in response to the flat bottom contact surface contacting the cylindrical surface during the landing, and to passively maintain the inward orientation of the flat bottom contact surface and the outward orientation of the center of gravity during the takeoff, wherein each magnetic leg comprises an angle rotation sensor configured to measure a pivot of the pivoting portion about the pivot axis after the flat bottom contact surface contacts the cylindrical surface, and wherein the UAV further comprises a control circuit configured to determine when to switch on the magnets of the magnetic legs at the end of the landing using the measured pivots of the pivoting portions of the magnetic legs.

7. The UAV of claim 6, wherein for each magnetic leg, the pivoting portion comprises a switch actuator coupled to a top of the magnet and configured to actuate the magnet in order to switch the magnet between on and off, and the control circuit is further configured to control the switch actuator to switch on the magnet when the measured pivots of the pivoting portions of the magnetic legs are the same inward angle.

8. The UAV of claim 1, wherein the ferromagnetic cylindrical surface is part of a carbon steel pipe or vessel.

9. A method of landing, taking off, and magnetically perching an unmanned aerial vehicle (UAV) on a ferromagnetic cylindrical surface, the UAV comprising a body and a plurality of articulated magnetic legs each having a fixed portion coupled to the body and a pivoting portion pivotably coupled to the fixed portion at a pivot axis, the pivoting portion having a center of gravity with respect to the pivot axis and comprising a flat bottom contact surface, a switchable magnet and a single articulation joint having a single degree of freedom about the pivot axis, the method comprising:
landing the UAV on the ferromagnetic cylindrical surface using the magnetic legs;
passively orienting, for each magnetic leg using the single articulation joint with the single degree of freedom about the pivot axis, (1) the flat bottom contact surface inward and tangent to the cylindrical surface and (2) the center of gravity to an outward side of the pivot axis, in response to the flat bottom contact surface contacting the cylindrical surface during the landing;
magnetically attaching the UAV to the ferromagnetic cylindrical surface at an end of the landing by switching on the switchable magnet in each magnetic leg;
magnetically perching the UAV on the ferromagnetic cylindrical surface after the landing using the magnetic legs while their respective switchable magnets remain switched on;
magnetically detaching the UAV from the ferromagnetic cylindrical surface at a beginning of the takeoff by switching off the switchable magnet in each magnetic leg;
taking off with the UAV from the cylindrical surface after the perching; and
passively maintaining, for each magnetic leg using the articulation joint and with the center of gravity of the pivoting portion being on the outward side of the pivot axis, the inward orientation of the flat bottom contact surface and the outward orientation of the center of gravity during the takeoff.

10. The method of claim 9, further comprising limiting, for each magnetic leg using an inward rotation limiter of the fixed portion of the magnetic leg, an inward rotation of the flat bottom contact surface and an outward rotation of the center of gravity during the landing and the takeoff.

11. The method of claim 9, further comprising:
landing the UAV on a flat landing surface using the magnetic legs;
passively orienting, for each magnetic leg using the single articulation joint with the single degree of freedom about the pivot axis, (1) the flat bottom contact surface parallel to the flat landing surface and (2) the center of gravity to an inward side of the pivot axis in response to the flat bottom contact surface contacting the flat landing surface during the landing on the flat landing surface;
taking off with the UAV from the flat landing surface; and
passively maintaining, for each magnetic leg using the articulation joint and with the center of gravity of the pivoting portion being on the inward side of the pivot axis, the flat orientation of the flat bottom contact surface and the inward orientation of the center of gravity during the takeoff from the flat landing surface.

12. The method of claim 11, further comprising limiting, for each magnetic leg using an outward rotation limiter of the fixed portion of the magnetic leg, (1) an outward rotation of the flat bottom contact surface to a mostly flat orientation and (2) an inward rotation of the center of gravity, during the landing on and the takeoff from the flat landing surface.

13. The method of claim 9, further comprising, for each magnetic leg, measuring a pivot of the pivoting portion about the pivot axis after the flat bottom contact surface contacts the cylindrical surface using an angle rotation sensor of the magnetic leg.

14. The method of claim 13, further comprising determining, by a control circuit of the UAV, when to switch on the magnets of the magnetic legs at the end of the landing using the measured pivots of the pivoting portions of the magnetic legs.

15. The method of claim 14, wherein for each magnetic leg, the method further comprises actuating the magnet, using a switch actuator of the pivoting portion and coupled to a top of the magnet, in order to switch the magnet between on and off, and controlling, by the control circuit, the switch actuator to switch on the magnet when the measured pivots of the pivoting portions of the magnetic legs are the same inward angle.

16. The method of claim 13, further comprising determining, by a control circuit of the UAV, the diameter of a cylinder corresponding to the cylindrical surface using the measured pivots of the pivoting portions of the magnetic legs.

17. The method of claim 13, further comprising determining, by a control circuit of the UAV, a distance from the body to the cylindrical surface using the measured pivots of the pivoting portions of the magnetic legs.

18. The UAV of claim 6, wherein the fixed portion of each magnetic leg comprises an inward rotation limiter configured to limit an inward rotation of the flat bottom contact surface and an outward rotation of the center of gravity during the landing and the takeoff.

19. The UAV of claim 6, wherein the UAV is further configured to land on and take off from a flat landing surface, and the articulation joint of each magnetic leg is further configured to provide the pivoting portion and the center of gravity with the single degree of freedom about the pivot axis in order to passively orient (1) the flat bottom contact surface parallel to the flat landing surface and (2) the center of gravity to an inward side of the pivot axis in response to the flat bottom contact surface contacting the flat landing surface during the landing on the flat landing surface, and to passively maintain the flat orientation of the flat bottom contact surface and the inward orientation of the center of gravity during the takeoff from the flat landing surface.

20. The UAV of claim 19, wherein the fixed portion of each magnetic leg comprises an outward rotation limiter to limit an outward rotation of the flat bottom contact surface to a mostly flat orientation and to limit an inward rotation of the center of gravity, during the landing on and the takeoff from the flat landing surface.

\* \* \* \* \*